United States Patent [19]

Dalke

[11] 4,024,996

[45] May 24, 1977

[54] METERING DISPENSER FOR PACKAGE FLUENT PRODUCTS

[76] Inventor: Charles Arthur Dalke, 1151 Lansdale Court, San Jose, Calif. 95120

[22] Filed: Apr. 9, 1976

[21] Appl. No.: 675,463

[52] U.S. Cl. .............................. 222/437; 222/457
[51] Int. Cl.² ......................................... G01F 11/28
[58] Field of Search .......... 222/454, 455, 456, 457, 222/437

[56] References Cited

UNITED STATES PATENTS

| | | | |
|---|---|---|---|
| 2,523,426 | 9/1950 | Gray | 222/455 X |
| 2,668,641 | 2/1954 | Martischang | 222/455 |
| 2,853,213 | 9/1958 | Buehlig | 222/455 |
| 2,952,392 | 9/1960 | Matter | 222/456 X |

FOREIGN PATENTS OR APPLICATIONS 629,937  10/1961  Canada ............................ 222/456

Primary Examiner—Stanley H. Tollberg
Assistant Examiner—Hadd Lane
Attorney, Agent, or Firm—Gerald L. Moore

[57] ABSTRACT

The present invention relates to a metering dispenser attachment for packaged fluent products, and more particularly to a dispenser attachment adapted to be mounted on an exterior surface of the package for cooperation with an existing dispensing opening. A metering chamber is included for receiving products through the dispensing opening and accumulating a predetermined amount when the package is turned upside down. Dispensing of the accumulated product is then achieved when the package is turned right side up.

1 Claim, 7 Drawing Figures

U.S. Patent May 24, 1977 Sheet 2 of 3 4,024,996
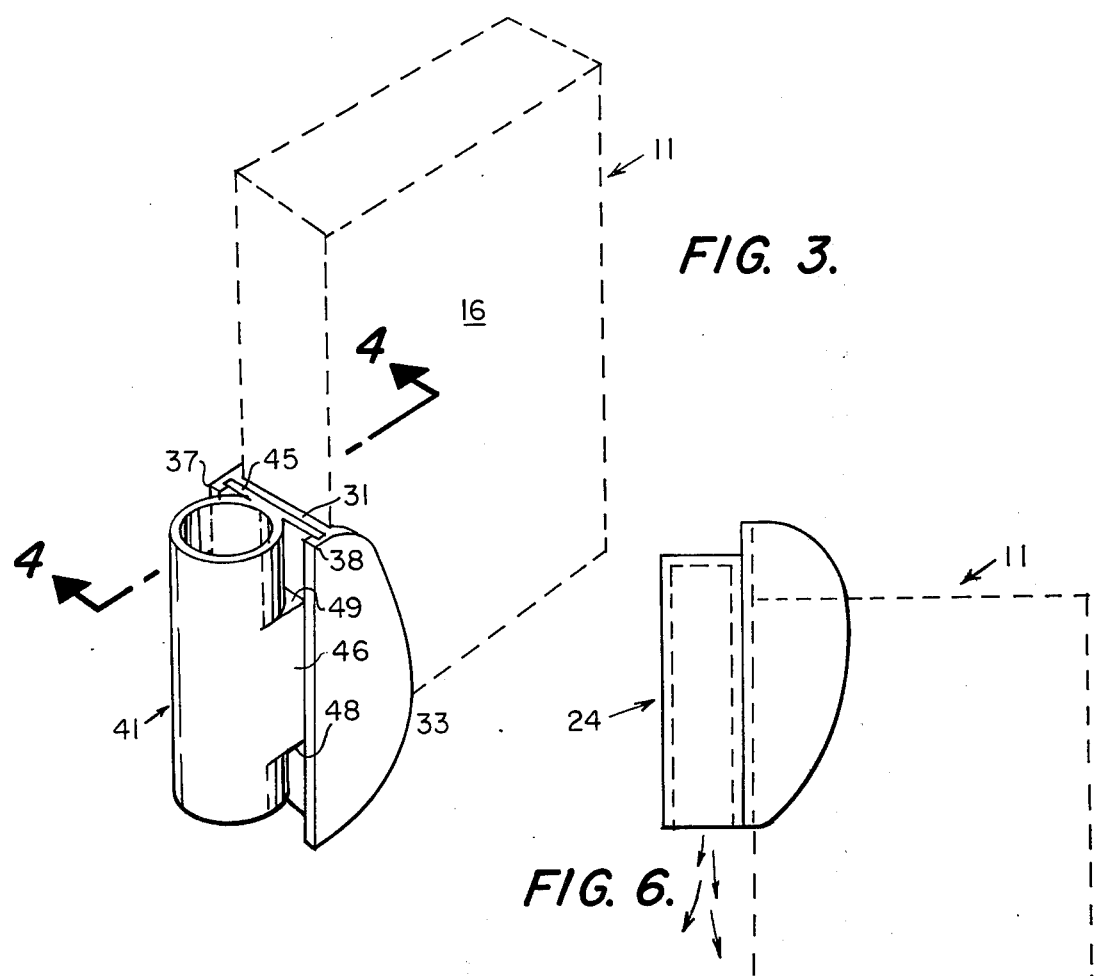
FIG. 3.
FIG. 6.
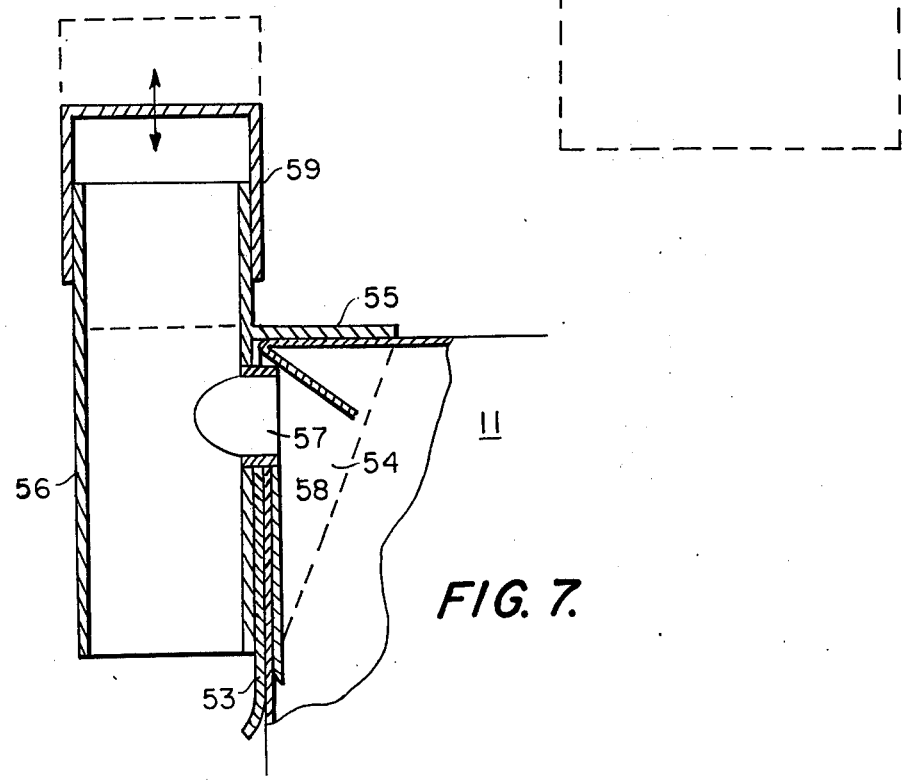
FIG. 7.

METERING DISPENSER FOR PACKAGE FLUENT PRODUCTS

BACKGROUND OF THE INVENTION

Dispensing attachments for packaged fluent products are well-known, but have generally been adapted to be received within the interior of the package. This has usually required the dispenser to be assembled with the package when it is put together and likewise discarded with the package when it is empty. One known type of dispensing attachment has been provided for insertion through the top of a package into its interior. This type is removable when the package is empty, but it is difficult to mount on the package, since it requires punching an opening in the top of the package for insertion of the attachment. The top of most fluent product packages consists of side and end flaps folded upon one another and glued together. Therefore the attachment opening must be cut through three layers of laminated cardboard. This requires a heavy knife or special tool to create the proper sized opening for insertion of the dispenser.

The shortcomings of the prior known dispensing attachments have been overcome by the present invention by provision of a dispenser attachment adapted to be removably mounted on an exterior surface of the package in alignment with the dispensing opening provided in the package. The attachment mounts on an edge of the dispensing opening and provides a means of observing the amount of product to be dispensed before it is discharged from the dispenser.

SUMMARY OF THE INVENTION

A metering dispenser attachment for dispensing fluent materials from a package including a backing member fixed along the side of the package and holding an inverted container. The container has an opening in the side aligned with an opening in the package. To dispense the fluent material, the package is inverted to allow a measured quantity to flow into the container through the side opening, thereafter by turning the package upright, the material is poured from the container.

DESCRIPTION OF THE DRAWINGS

FIG. 3 is a perspective view of a second embodiment of the invention mounted on a package and in the metering position;

FIG. 6 is an elevation view of the embodiment of FIG. 3 in the dispensing position; and FIG. 7 is an elevation view in cross-section of a third embodiment of the present invention.

DESCRIPTION OF THE INVENTION

Figure 1:
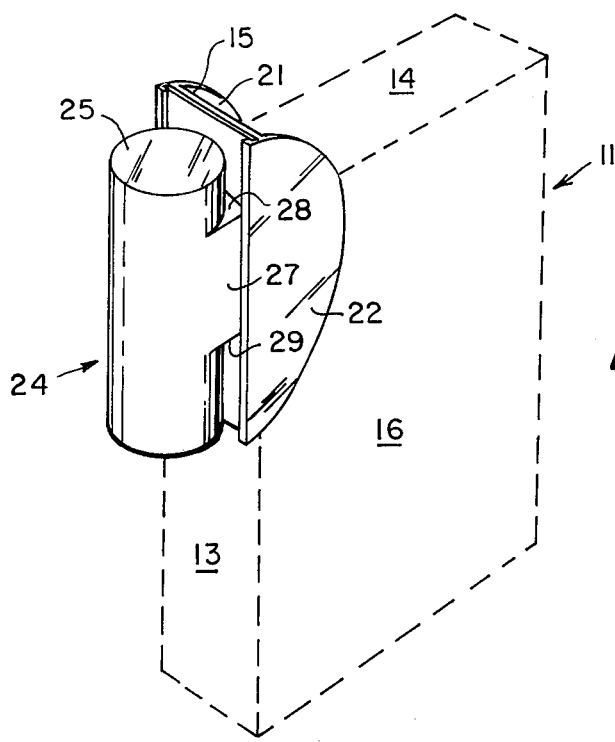
FIG. 1 is a perspective view of a first embodiment of the dispenser attachment of the present invention mounted on a package.

In FIG. 1 is shown a standard package or box 11 of the type for holding such dry, fluent products as granulated soap powder. Such packages are well-known and usually are made in various sizes. All include a perforated flap 12 (FIG. 2) positioned on a narrow side 13 near the top 14 of the package. By exerting an inward pressure on the flap, the package material can be torn along the line of perforations for opening the package so the contained material can be poured out. It is this general type of package with which the subject invention may be used.

Figure 2:
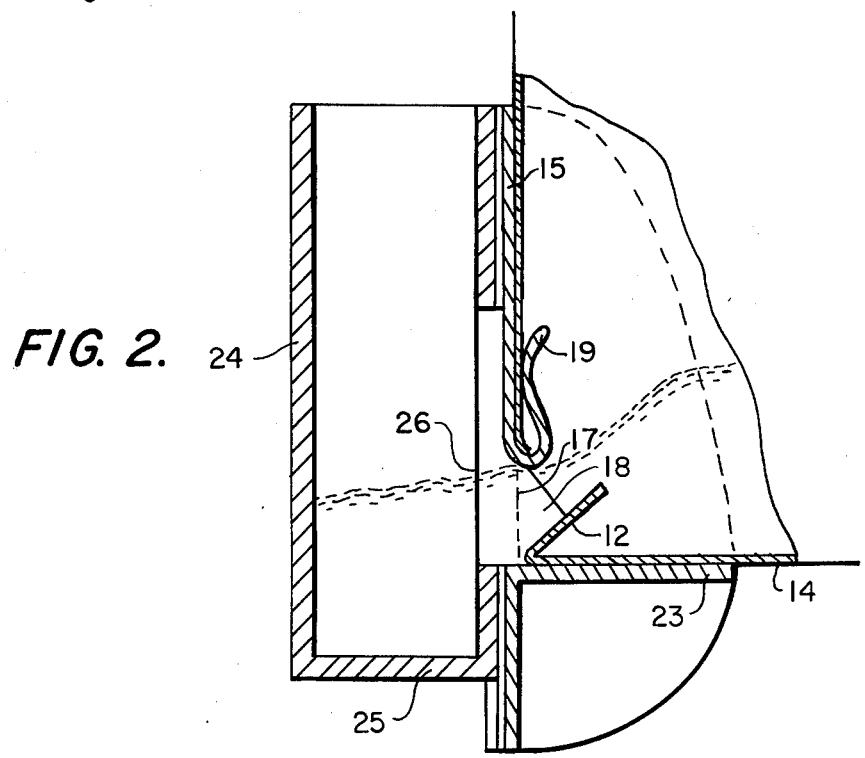
FIG. 2 is an elevation view in section and at an enlarged scale showing the attachment of FIG. 1 in the metering position.

The subject invention is provided for dispensing a controlled amount of material from a container such as the package 11. Referring to FIGS. 1 and 2, a first embodiment of the dispenser attachment of the present invention is illustrated as including a flat, rectangular backing member 15 adapted to lie against the external side or surface 16 of the fluent material package 11. The backing member is provided with an aperture 17 and a pair of protrusions 18 positioned on either side of the aperture and extending essentially the length thereof to hold open the flap 12. An attachment clip 19 is provided at one end of the aperture and is spring-loaded toward the planar section of the backing member. A pair of said members 21 and 22 extend along the lateral edges of the backing member and are positioned to overlie the side panels 16 of the package. An end brace 23 extends at right angles to the backing member and is secured to each of the side members and overlies edge 14.

A generally cylindrical dispensing tube or container 24 closed at one end by an end wall 25 forms a metering cup for the dispenser attachment. A window 26 is provided in one side of the tube spaced from the end wall 25. The tube is attached to the backing member 15 by longitudinal and horizontal flanges 27, 28 and 29. The flanges surround the aperture 17 and the window 26 and provide a conduit between the interior of the box or package and the interior of the tube. The size of the aperture and window and the distance from the end wall 25 are selected to define the quantity of fluent material to be metered for dispensing.

As shown in FIG. 2, the fluent material will flow past flap 12 through the dispensing opening, through aperture 17 and window 26 into the interior of the tube when the package 11 is inverted. The fluent material will build up in the metering cup to a depth defined by the upper edges of the opening, aperture and window. The natural resistance to flow exhibited by such granulated materials causes the flow to cease when the window 26 is covered by the material in the tube. Thus a predetermined quantity is dispensed from the package each time it is inverted. With subsequent turning of the package back upright as shown in FIG. 6, this measured quantity is poured from the dispensing tube.

Figure 4:
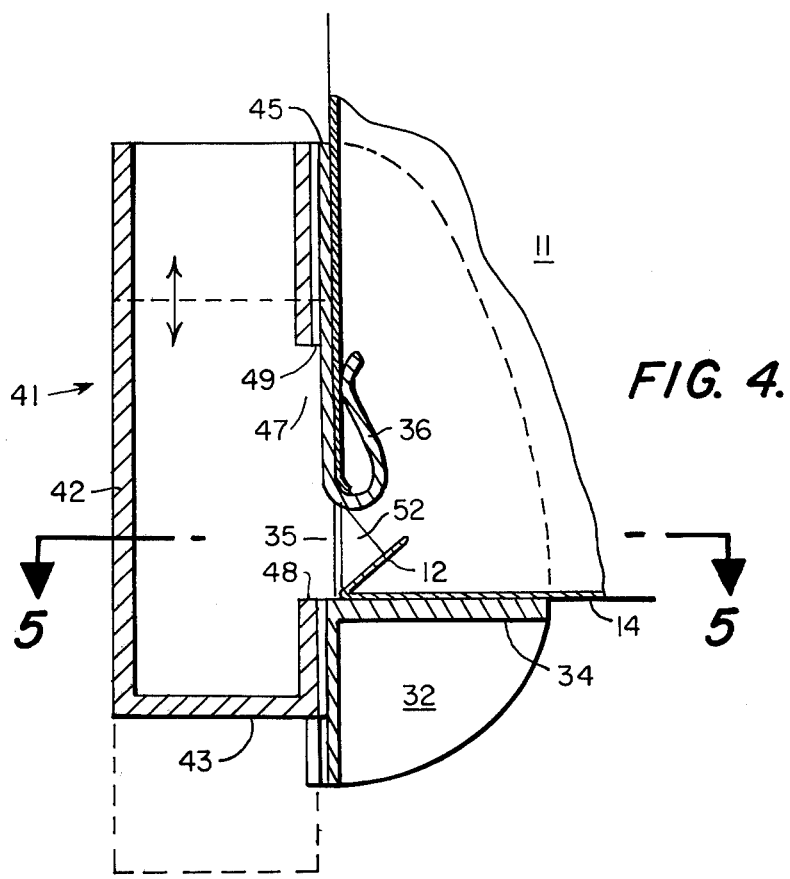
FIG. 4 is a sectional view taken along lines 4—4 of FIG. 3 and at an enlarged scale.
Figure 5:
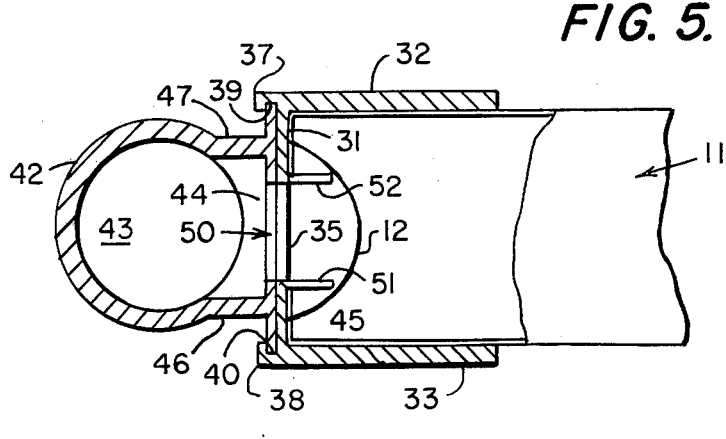
FIG. 5 is a sectional view taken along lines 5—5 of FIG. 4.

In accordance with another feature of the invention and as shown in FIGS. 3, 4 and 5, the amount of material dispensed can be adjusted by a simple manipulation of the attachment. However it should be realized that adjustment is not always necessary but is a desirable feature of the invention in many instances. The embodiment of FIG. 3 includes a backing member 31 affixed to side members 32 and 33 and an end brace 34. An aperture 35 is provided in the backing member and an attachment clip 36 is fixed in position at one edge of the aperture. A pair of guides 37 and 38 are formed by extending the side members 32 and 33 beyond the backing member 31. The guides include oppositely directed grooves 39 and 40 extending the length of the backing member. A dispensing tube or container 41 includes a generally cylindrical section forming side walls 42 closed at one end by an end wall 43 to provide a metering cup. An elongated window 44 is provided in one side of the cylindrical section and the tube is attached to a rectangular sliding panel 45 by means of longitudinally extending flanges 46 and 47 and horizontal flanges 48 and 49. The longitudinal edges of the panel 45 are received within the grooves 39 and 40 in the guides to attach the dispensing container on the backing member. An opening 50 is provided in the sliding panel in alignment with the window 44. A pair of protrusions 51 and 52 are positioned on either side of the aperture 35 extending the length thereof to hold open the flap 12.

In the manner just described, provision is made for adjusting the amount of material dispensed with each, inverting of the package. By sliding the panel 45 vertically to shift its position relative to the aperture 35 in the backing member, the spacing between the far aperture edge and the tube end wall 43 is varied. As a result, the volume of material permitted to flow into the dispensing tube before covering the aperture is varied to vary the amount of material dispensed. While not shown, calibrating marks can be placed on the dispensing tube to indicate the amount dispensed at each position setting of the tube.

An alternative embodiment of the invention is illustrated in FIG. 7 as including a backing member 53 secured to side braces 54 and an end brace 55. A generally cylindrical dispensing tube 56 is secured to the backing member and a conduit 57 is secured to the tube 56 and extends through an opening in the backing to protrude into the interior of a box 11. An interior guide or clip 58 is secured to the conduit and is received within the interior of the box to retain the attachment on the box. The conduit protrudes through the dispensing opening in the box and holds flap 12 in its open position. The dispensing tube 56 is closed at one end of a cylindrical cap 59 telescoped thereover and held in place by the frictional engagement with the tube. The dispenser attachment of the present invention preferably is molded of a light, strong material such as polyethylene, polycarbonate, polystyrene or the like. The dispenser is illustrated as being attached to a package adjacent one corner thereof.

The present invention can be used with most fluent material packages such as powdered soap boxes which are provided with the perforated section or flap 12 on one end surface immediately adjacent to the top of the package to form a dispensing opening as previously described. The dispenser attachment illustrated in FIGS. 3, 4 and 5 is mounted on the package for cooperation with such a dispensing opening. One preferred method of mounting the dispenser involves aligning the clip end 36 with the flap opening with the backing member 31 pressed against the surface 13 of the box. Downward pressure on the dispenser will cause the clip to enter the box interior through the dispensing opening as the backing member slides down the box. In this position the backing member bears against the external surface of the end of the package with the attachment clip passed through the dispensing opening in the package so as to grip the end of the package between the clip and the backing member. The protrusions 51 and 52 extend through the dispensing opening into the interior of the package and maintain the flap 12 clear of the dispensing opening thereby allowing egress of the fluent material. The side members 32 and 33 bear against the side panels of the package and the end brace 34 bears against the top of the package. Thus the dispenser attachment of the present invention is positioned firmly on the package so as not to be easily dislodged while handling the package. In addition the clip 36, side members 32 and 33 and the backing member 31 serve to seal around the package opening such that powder flowing from the opening will pass directly into the dispensing container 41 without spilling between the metering dispenser and the package. The attachment of FIGS. 1 and 2 is mounted similarly with clip 19 received within the dispensing opening and protrusions 18 holding the flap open. In the embodiment of FIG. 7 the clip 58 is passed through the dispensing opening and the conduit 57 holds the flap open.

The present invention dispenses the fluent material from the package as it is turned upside down as indicated in FIG. 4. In each embodiment of the invention, this action allows the fluent material in the package to flow through the dispensing opening and pass through aperture 35, opening 50 and window 44, and be received within the metering cup at the end of the dispensing tube. The fluent material in the package, i.e., laundry detergent, soap flakes, powders, rice, popcorn or other granulated material will flow through the dispensing opening into the metering cup to the approximate level of the height of the dispensing opening. In the embodiment of FIG. 7 the quantity of material received within the metering cup and subsequently dispensed through the tube 56 can be varied by adjusting the position of the cap 59 on the tube to vary the capacity of the meter cup. In the embodiment of FIGS. 1 and 2 the dispensing attachment is made not adjustable by firmly fixing the tube 24 to the backing member 15. This has particular application if the dispensing attachment is always used to dispense one product, in such case adjustment may be an unnecessary function.

While I have shown a preferred embodiment of the invention, it will be understood that the invention is capable of variation and modification from the form shown so that the scope thereof should be limited only by the proper scope of the claims appended hereto.

The invention claimed:
1. A metering dispenser for attachment on a package for fluent products wherein the package includes a flap which can be opened to form an opening in a side panel near the top edge thereof for pouring the product from the package by tipping the package over, said dispenser attachment comprising, in combination:
  a backing member adapted to fit against the outside surface of the package adjacent said opening, said backing member having an opening therein;
  a clip fixed to the backing member and positioned to extend into said package opening for holding the backing member in position on the package with the backing member opening in alignment with the package opening;
  a dispensing container having side walls and an end wall with one side wall including an elongated opening therethrough;
  means for fixing the dispensing container to the backing member with the container side wall opening aligned with the package and backing member openings and with the container in the inverted position when the backing member is placed in position on the upright package, said means for fixing including a guide extending along the backing member and a panel attached to the container side wall for movement of the container relative to the backing member to vary the distance between the backing member opening and the container end wall thereby to vary the amount of fluent product flowing into the container; and means for sealing around the package opening including a plurality of wall members fixed to the backing member adjacent said backing member opening and positioned to project into the package opening and hold the flap open whereby by inverting the package, fluent material will be caused to flow through the opening and into the container to a level roughly corresponding to the top edge of the package opening such that a measured portion of such fluent material can be poured from the container as the package is returned to the upright position.

* * * * *